Figure 1:
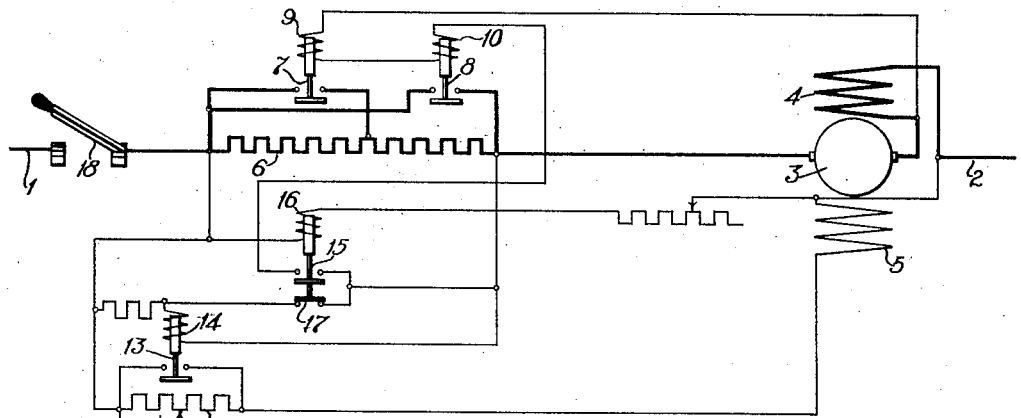

E. M. BOUTON.
CONTROL SYSTEM.
APPLICATION FILED MAR. 31, 1920.

1,363,635.

Patented Dec. 28, 1920.
2 SHEETS—SHEET 1.

WITNESSES:
J. B. Merrill
J. R. Langley

INVENTOR
Edgar M. Bouton
BY
Wesley G. Carr
ATTORNEY

E. M. BOUTON.
CONTROL SYSTEM.
APPLICATION FILED MAR. 31, 1920.

1,363,635.

Patented Dec. 28, 1920.
2 SHEETS—SHEET 2.

WITNESSES:
J. B. Merrill
J. R. Langley

INVENTOR
Edgar M. Bouton
BY
Wesley G. Carr
ATTORNEY

UNITED STATES PATENT OFFICE.

EDGAR M. BOUTON, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,363,635.  Specification of Letters Patent.  Patented Dec. 28, 1920.

Application filed March 31, 1920. Serial No. 370,189.

*To all whom it may concern:*

Be it known that I, EDGAR M. BOUTON, a citizen of the United States, and a resident of Wilkinsburg, in the county of Allegheny and State of Pennsylvania, have invented a new and useful Improvement in Control Systems, of which the following is a specification.

My invention relates to motor-control systems and particularly to such systems as are employed in connection with mine fans or similar devices.

The object of my invention is to provide a simple and efficient arrangement whereby an electric motor is prevented from operating as a generator upon the occurrence of low-voltage conditions.

In the operation of mine fans and similar machines, it is very desirable that the operation be maintained at approximately normal speed under all circumstances. When mine fans are supplied with energy from the same circuit that supplies energy to electric locomotives, it may occur that the voltage applied to the fan motors is reduced to such value that the usual low-voltage relay operates not only to insert the starting resistors in circuit with the respective motors, but to cause the relays for controlling the field resistors to remove the latter from circuit to insure full field excitation in readiness for the next starting operation. It will be evident that, in case a motor is operating at its normal speed and the applied voltage is suddenly reduced, the motor tends to operate as a generator. This condition is particularly true if, in accordance with the usual practice, the field relay operates to strengthen the field. The result is equivalent to that of dynamic braking and the motor is caused to operate at an abnormally low speed during the period of low-voltage conditions.

In accordance with my invention, an electric motor is accelerated automatically by means of contactors that are controlled either in accordance with the counter electromotive force of the motor or in accordance with the value of the current traversing the motor circuit. A field relay, which is connected across the terminals of the starting resistor, is controlled in accordance with the value of the current traversing the motor circuit and it operates to insert the field resistor when the potential across the starting resistor falls to a predetermined value. The starting resistor is inserted by the operation of a low-voltage relay upon the occurrence of low-voltage conditions. The field relay is prevented from closing, however, by the operation of the low-voltage relay to shunt the circuit of the actuating coil of the field relay. In a modification, the low-voltage relay effects the energization of a coil for opposing the force of the actuating coil of the relay.

In the accompanying drawings, Figure 1 is a diagrammatic view of circuits and apparatus embodying my invention; Figs. 2, 3, 4, 5 and 6 are similar views of modifications.

Referring particularly to Fig. 1, line conductors 1 and 2 supply energy to an electric motor, the armature of which is indicated at 3 and which is provided with a series field-magnet winding 4 and a shunt field-magnet winding 5. A sectional starting resistor 6 is controlled by contactors 7 and 8 having actuating coils 9 and 10, respectively, that are energized in accordance with the value of the counter electromotive force of the motor.

The excitation of the shunt field magnet winding 5 is controlled by a resistor 12 and a relay 13 having an actuating coil 14 that is connected across the resistor 6 and is, accordingly, energized in accordance with the value of the current traversing the motor circuit as measured by the drop in potential across the starting resistor. A low-voltage relay 15 having an actuating coil 16 that is connected across the line controls a circuit comprising the actuating coils 9 and 10. The low-voltage relay 15 is provided with a back-contact member 17 which controls a shunt circuit for the actuating coil 14 of the field relay.

It may be assumed that a line contactor 18, which is here represented as a knife-blade switch, has been closed to complete the motor circuit which comprises the starting resistor 6, armature 3 and series field-magnet winding 4. A heavy rush of current traverses the motor circuit and the drop in potential across the starting resistor 6 is such as to cause the coil 14 to close the field relay 13 and thereby insure full field excitation of the motor. The motor accelerates and its counter electromotive force increases to a corresponding degree. The contactors 7 and 8 are closed successively when the counter electromotive force of the motor reaches predetermined values. When the current traversing the motor circuit falls to a predetermined value, the coil 14 of the field relay 13 is deënergized to such degree that the latter opens to insert the resistor 12 in the field circuit and further accelerate the motor.

During the normal operation of the motor under normal voltage conditions, the low-voltage relay operates to maintain the circuit of the coils 9 and 10 and the coil 14 is energized to such degree as to maintain the closure of the field relay 13.

If the voltage applied to the motor falls to an abnormally low value, the low-voltage relay 15 opens the circuits of the coils 9 and 10 and the contactors 7 and 8 open to insert the starting resistor in circuit with the motor. The back-contact member 17 closes a shunt circuit for the coil 14 of field relay 13 and the latter remains in its open position with the resistor 12 in circuit with the field magnet winding 5.

Under such conditions, the motor tends to operate as a generator but this tendency is not increased as would occur if the field relay were arranged to exclude the resistor 12 in accordance with the customary practice in systems of the same general character. The insertion of the starting resistor prevents unduly rapid acceleration of the motor upon restoration of normal voltage conditions and, in addition, tends to prevent regeneration by the motor. The motor is thus maintained at the maximum possible speed under low-voltage conditions and the dynamic-braking effect of generator operation is minimized by the maintenance of a relatively weak field.

When the cause of low-voltage conditions is removed and normal conditions are restored, the low-voltage relay closes to complete the circuit of the actuating coils 9 and 10 of the accelerating contactors and the starting operation is repeated as described above.

Figure 2:
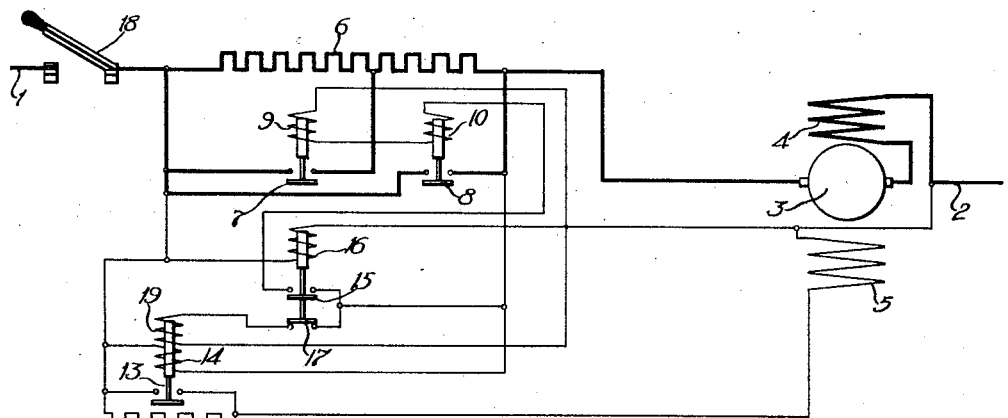

Reference may now be had to Fig. 2 in which corresponding parts are designated by reference numerals similar to those employed in connection with Fig. 1. The arrangement of Fig. 2 corresponds closely to that of Fig. 1. The field relay 13 is, however, provided with a coil 19 in addition to the actuating coil 14. The coil 19 is normally ineffective but, upon the opening of the low-voltage relay, the coil 19 is energized to oppose the force of the coil 14 and the latter is, accordingly, ineffective to close the relay 13 during low-voltage conditions. The operation of the system, as a whole, differs in no material respect from the system of Fig. 1, and a detailed description is, accordingly, deemed unnecessary.

Figure 3:
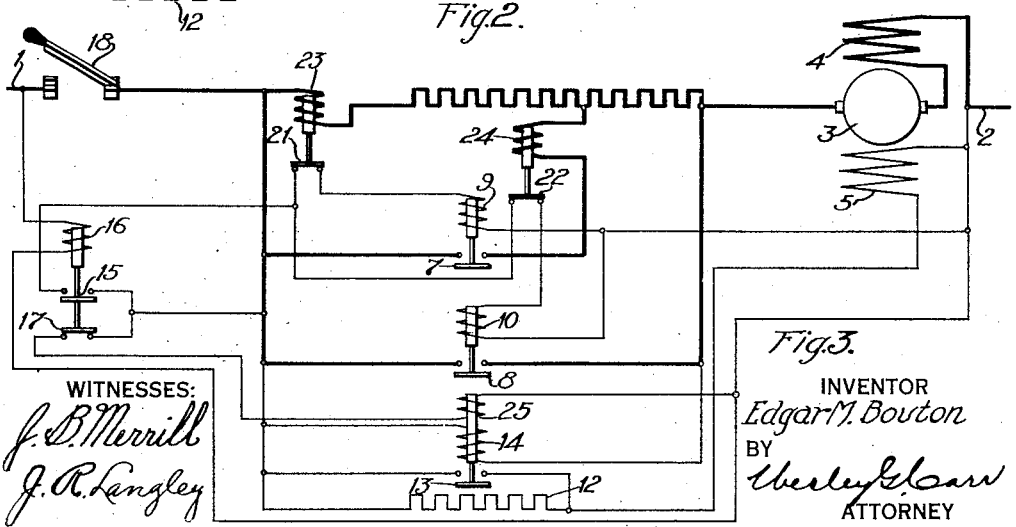

In the arrangement shown in Fig. 3, the starting resistor 6 is controlled by contactors 7 and 8, the actuating coils 9 and 10 of which are controlled respectively by current-limit relays 21 and 22 that are respectively provided with series-actuating coils 23 and 24. The field relay 13 is provided with the actuating coil 14 and an additional coil 25, the latter being connected across the line by the back-contact member 17 upon the occurrence of low-voltage conditions. The low-voltage relay 15 controls the circuits of the actuating coils 9 and 10 of the accelerating contactors. The operation of the system is otherwise identical with that of the systems described above.

Figure 4:
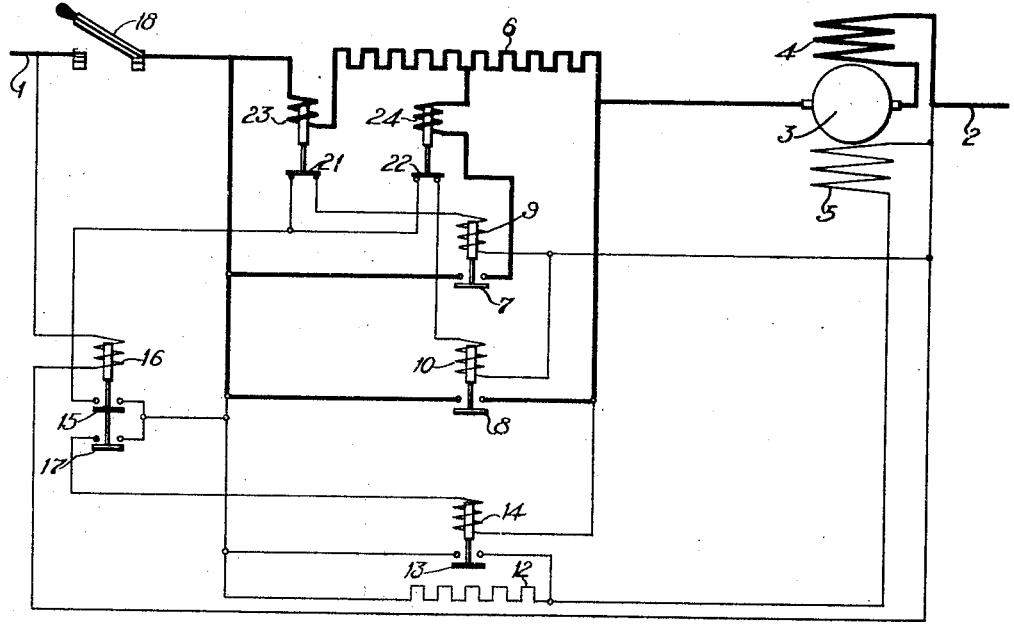

In the arrangement shown in Fig. 4, the field relay 13 is provided with a single coil 14 that is energized only when the low-voltage relay 15 is in its closed position to complete the circuits of the actuating coils of the accelerating contactors. When the low-voltage relay opens, the actuating coil 14 of the relay is ineffective to close the relay 13. In other respects, this system conforms in arrangement and operation to the system of Fig. 3.

Figure 5:
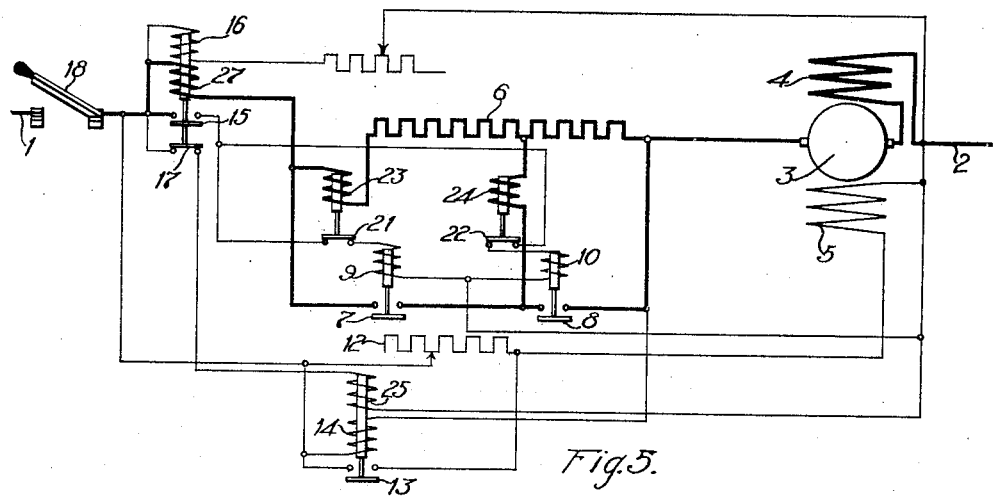

The modification illustrated in Fig. 5 embodies the same general arrangement for controlling the starting resistor that is employed in connection with the systems of Figs. 3 and 4. The field relay 13 is provided with two coils, one of which operates to oppose the actuating coil under low-voltage conditions in the manner described in connection with the arrangements of Figs. 2 and 3. In the present arrangement, the low-voltage relay 15 is provided with the shunt actuating coil 16 and, in addition, with a series actuating coil 27. The employment of the series coil 27 insures the opening of the low-voltage relay upon the reversal of the current traversing the motor circuit. The operation of the system does not differ otherwise from the operations of the several systems heretofore described.

Figure 6:
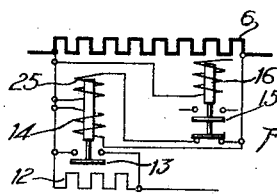

A portion of an arrangement similar to those of the preceding figures is shown in Fig. 6. The field relay 13 is provided with two actuating coils 14 and 25, the former of which is energized in accordance with the drop in potential across the resistor 6 to close the relay. The coil 25, the circuit of which is controlled by the low-voltage relay 15, is also connected across the resistor 6 and, when energized, exerts an equal and opposite force to that of the coil 14. Since the field relay coils are energized from the same source, there is no danger of failure of the protective means to operate under low-voltage conditions.

It will be noted that I provide an arrangement for preventing the operation of an electric motor as a generator under low-voltage conditions. The field relay is so controlled that it does not operate under low-voltage conditions to shunt the field resistor and thereby decrease the speed of the motor by strengthening the motor field. This arrangement finds particular application in connection with mine fans where the safety of human lives is dependent upon the operation of such devices at maximum possible efficiency under all conditions. My invention may be applied, also, to systems for other purposes in which the voltage may vary because of heavy intermittent loads.

I claim as my invention:

1. In a motor control system, the combination with an electric motor having a field-magnet winding, and a relay for controlling the excitation of said winding in accordance with the value of the current traversing said motor, of means for rendering said relay ineffective to increase the field excitation upon the occurrence of low-voltage conditions.

2. In a motor control system, the combination with an electric motor having a field-magnet winding, and a relay for controlling the excitation of said winding in accordance with the value of the current traversing said motor, of means comprising a low-voltage relay for insuring that said controlling relay is in its open position when low-voltage conditions obtain in the circuit of said motor.

3. In a motor control system, the combination with an electric motor having a field-magnet winding, means for controlling the excitation of said field-magnet winding, and means for controlling the resistance of the main circuit of said motor, of means for controlling the effectiveness of each of the aforesaid means in accordance with the value of the voltage applied to said motor.

4. In a motor control system, the combination with an electric motor having a field-magnet winding, means for controlling the excitation of said field-magnet winding, and means for controlling the resistance of the main circuit of said motor, of a low-voltage relay for controlling the effectiveness of each of the said controlling means.

5. In a motor control system, the combination with an electric motor, a starting resistor, a contactor for controlling said resistor and a field relay for controlling the field excitation of said motor, of a low-voltage relay for effecting the insertion of said resistor in circuit with said motor and preventing the closing of said field relay upon the occurrence of low-voltage conditions.

6. In a motor control system, the combination with an electric motor, a starting resistor, a contactor for controlling said resistor and a field relay for controlling the field excitation of said motor, said relay being controlled in accordance with the value of the current traversing said motor, of a low-voltage relay for effecting the insertion of said resistor in circuit with said motor and preventing the closing of said field relay upon the occurrence of low-voltage conditions.

7. In a motor control system, the combination with an electric motor, a starting resistor, a contactor for controlling said resistor and a field relay for controlling the field excitation of said motor, said relay having a coil energized in accordance with the value of the current traversing the motor circuit and having also means for opposing said coil under predetermined conditions, and a low-voltage relay for effecting the insertion of said starting resistor in circuit with said motor upon the occurrence of low-voltage conditions and for rendering said opposing means effective when such conditions obtain in the motor circuit.

In testimony whereof, I have hereunto subscribed my name this 26th day of March, 1920.

EDGAR M. BOUTON.